US012671185B2

(12) United States Patent
Zhu et al.

(10) Patent No.: US 12,671,185 B2
(45) Date of Patent: Jun. 30, 2026

(54) VEHICLE ANTENNA WITH SHORTED CONDUCTIVE STRUCTURE AROUND ITS RADIATOR

(71) Applicant: JAGUAR LAND ROVER LIMITED, Coventry (GB)

(72) Inventors: Shaozhen Zhu, Coventry (GB); Emma Kowalczuk, Coventry (GB)

(73) Assignee: Jaguar Land Rover Limited, Whitley (GB)

( * ) Notice: Subject to any disclaimer, the term of this patent is extended or adjusted under 35 U.S.C. 154(b) by 136 days.

(21) Appl. No.: 18/285,377

(22) PCT Filed: Mar. 31, 2022

(86) PCT No.: PCT/EP2022/058710
§ 371 (c)(1),
(2) Date: Oct. 2, 2023

(87) PCT Pub. No.: WO2022/207878
PCT Pub. Date: Oct. 6, 2022

(65) Prior Publication Data

US 2024/0235037 A1 Jul. 11, 2024

(30) Foreign Application Priority Data

Mar. 31, 2021 (GB) ..................................... 2104579

(51) Int. Cl.
*H01Q 9/36* (2006.01)
*H01Q 1/32* (2006.01)
(Continued)

(52) U.S. Cl.
CPC ............... *H01Q 9/36* (2013.01); *H01Q 5/378* (2015.01); *H01Q 9/40* (2013.01); *H01Q 1/3275* (2013.01)

(58) Field of Classification Search
CPC ........ H01Q 1/32; H01Q 1/3275; H01Q 5/378; H01Q 9/36; H01Q 9/40
See application file for complete search history.

(56) References Cited

U.S. PATENT DOCUMENTS 2,996,713 A * 8/1961 Boyer .................. H01Q 1/3275 343/745
4,821,040 A * 4/1989 Johnson ............... H01Q 9/0464 343/789
(Continued)

FOREIGN PATENT DOCUMENTS

CN 106252853 A 12/2016
EP 2424036 A2 * 2/2012 ............... H01Q 7/00
(Continued)

OTHER PUBLICATIONS

Combined Search and Examination Report for Application No. GB2104579.4, dated Aug. 6, 2021, 9 pages.
(Continued)

*Primary Examiner* — Ab Salam Alkassim, Jr.
(74) *Attorney, Agent, or Firm* — TROUTMAN PEPPER LOCKE LLP; Dustin B. Weeks; Nicholas H. Doss

(57) ABSTRACT

A vehicle antenna (20) comprising:
- a radiator (24) configured to extend from a ground plane (26);
- a feed point (28);
- a conductive structure (30) around a portion (240) of the radiator, the portion being distal from the ground plane;
- an electrical gap (34) between the conductive structure and the portion of the radiator; and
- a shorting arrangement (32) configured to electrically connect the conductive structure to ground.

20 Claims, 3 Drawing Sheets

(51) Int. Cl.
*H01Q 5/378* (2015.01)
*H01Q 9/40* (2006.01)

(56) References Cited

U.S. PATENT DOCUMENTS

| | | | | | |
|---|---|---|---|---|---|
| 5,181,044 | A * | 1/1993 | Matsumoto | H01Q 1/3275 343/700 MS | |
| 10,312,602 | B2 * | 6/2019 | Sanford | H01Q 9/0407 | |
| 10,411,357 | B1 * | 9/2019 | Ashraf | H01Q 9/40 | |
| 11,784,400 | B2 * | 10/2023 | Tsuchiya | H01Q 1/422 343/702 | |
| 2002/0171593 | A1 * | 11/2002 | Wakui | H01Q 5/371 343/700 MS | |
| 2003/0103008 | A1 * | 6/2003 | Petropoulos | H01Q 1/243 343/702 | |
| 2007/0126637 | A1 * | 6/2007 | Habib | H01Q 5/50 343/700 MS | |
| 2011/0279342 | A1 * | 11/2011 | Takahashi | H01Q 9/40 343/845 | |
| 2014/0285387 | A1 * | 9/2014 | Lindenmeier | H01Q 1/27 343/713 | |
| 2015/0155630 | A1 * | 6/2015 | Jiang | H01Q 9/0464 343/700 MS | |
| 2015/0311593 | A1 * | 10/2015 | Fasenfest | H01Q 9/40 343/786 | |
| 2015/0357720 | A1 | 12/2015 | Chen et al. | | |
| 2016/0211573 | A1 * | 7/2016 | Gardner | H01Q 1/48 | |
| 2017/0187126 | A1 * | 6/2017 | Sanford | H01Q 9/0407 | |
| 2017/0294714 | A1 * | 10/2017 | Lindenmeier | H01Q 9/40 | |
| 2018/0358697 | A1 * | 12/2018 | Zhou | H01Q 1/2291 | |
| 2020/0292654 | A1 * | 9/2020 | Kumagai | B60R 11/02 | |
| 2022/0102833 | A1 * | 3/2022 | Jeong | H01Q 1/3233 | |
| 2022/0149514 | A1 * | 5/2022 | Tsuchiya | H01Q 5/15 | |
| 2022/0158325 | A1 * | 5/2022 | Locke | H01Q 21/28 | |
| 2022/0200139 | A1 * | 6/2022 | Ryu | H01Q 1/243 | |
| 2022/0216602 | A1 | 7/2022 | Ryu et al. | | |
| 2022/0255213 | A1 * | 8/2022 | Ryu | H01Q 21/28 | |
| 2022/0336946 | A1 | 10/2022 | Ryu et al. | | |
| 2022/0368009 | A1 | 11/2022 | Ryu et al. | | |
| 2022/0384955 | A1 * | 12/2022 | Kim | H01Q 21/28 | |
| 2023/0058277 | A1 * | 2/2023 | Odes | H01Q 11/083 | |
| 2024/0047879 | A1 * | 2/2024 | Nozaki | H01Q 19/22 | |

FOREIGN PATENT DOCUMENTS

| | | | | |
|---|---|---|---|---|
| JP | 2007097115 | A * | 4/2007 | |
| KR | 101850061 | B1 | 6/2018 | |
| KR | 101888399 | B1 | 8/2018 | |
| KR | 102238515 | B1 * | 4/2021 | H01Q 1/48 |
| WO | WO-9635241 | A1 * | 11/1996 | H01Q 21/28 |
| WO | 2009110131 | A1 | 9/2009 | |
| WO | 2012144247 | A1 | 10/2012 | |
| WO | 2021020599 | A1 | 2/2021 | |
| WO | 2021045268 | A1 | 3/2021 | |
| WO | 2021049674 | A1 | 3/2021 | |
| WO | 2021054494 | A1 | 3/2021 | |

OTHER PUBLICATIONS

International Search Report and Written Opinion for Application No. PCT/EP2022/058710, dated Aug. 5, 2022, 90 pages.

Office Action received in related European Application No. 22720938.4, mailed Jul. 30, 2025 (10 pages).

* cited by examiner

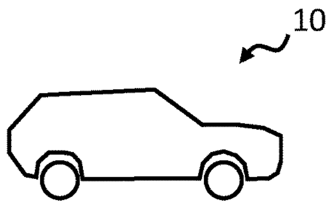
FIG. 1
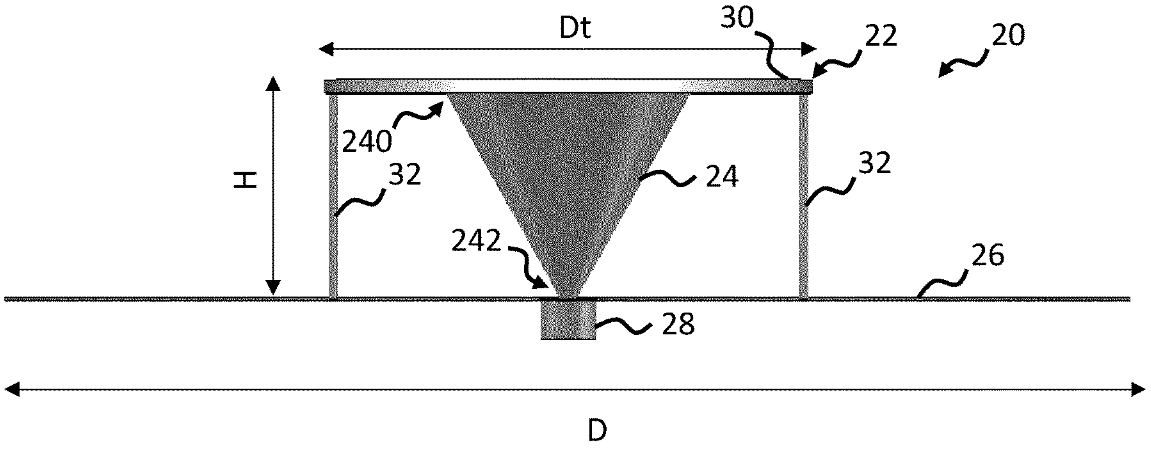
FIG. 2
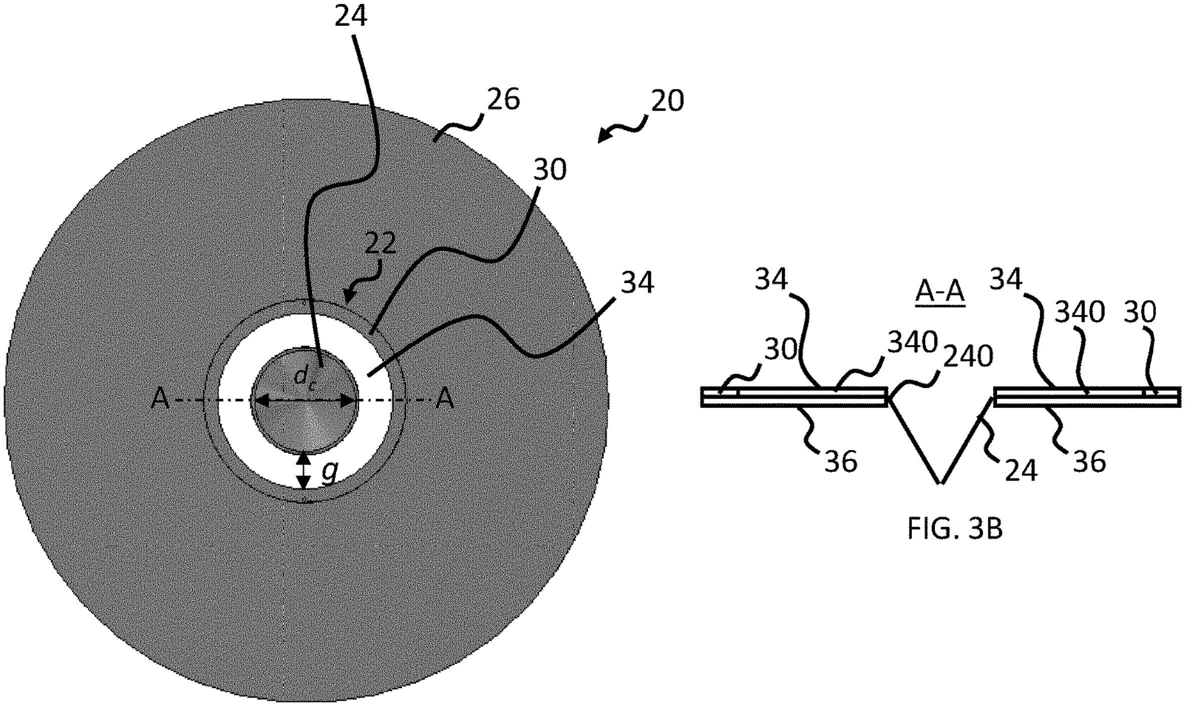
FIG. 3A
FIG. 3B

VEHICLE ANTENNA WITH SHORTED CONDUCTIVE STRUCTURE AROUND ITS RADIATOR

TECHNICAL FIELD

The present disclosure relates to a vehicle antenna with a shorted conductive structure around its radiator. In particular, but not exclusively the shorted conductive structure is a capacitance hat and the radiator is an inverted cone radiator.

BACKGROUND

Vehicles are increasingly requiring several antennas to meet growing consumer expectations for connectivity. The connectivity can include streaming music, videos, receiving over-the-air software updates for the vehicle, security features and much more. New Radio Access Technologies, such as 5G, allow the exchange of more data in parallel, making it feasible for customers to receive more services as they travel in the vehicle.

Antennas can be distributed at multiple locations around the vehicle, to increase MIMO (multiple-input, multiple-output) capability and reduce mutual coupling of antenna elements.

A vehicle will typically comprise a roof pod, also referred to as a 'shark fin', comprising one or more transceiver or transmitter antennas. However, a roof pod does not create the desired image of a sleek vehicle body shape and can adversely affect vehicle aerodynamic performance.

SUMMARY OF THE INVENTION

It is an aim of the present invention to provide an improved antenna apparatus. The invention is as defined in the appended independent claims.

According to an aspect of the invention there is provided a vehicle antenna comprising:

a radiator configured to extend from a ground plane;

a feed point;

a conductive structure around a portion of the radiator, the portion being distal from the ground plane;

an electrical gap between the conductive structure and the portion of the radiator; and a shorting arrangement configured to electrically connect the conductive structure to ground.

An advantage is that the antenna can be both omnidirectional and located in an unobtrusive location compared with a roof pod. The antenna can require only a small ground plane and can resonate over a wide bandwidth that covers low and high frequencies.

In some examples, the radiator comprises a shape having an increasing cross-sectional area with increasing distance from the ground plane. In some examples, the shape is hollow. In some examples, the radiator comprises a surface of revolution. In some examples, the shape is conical. In some examples, the radiator, the conductive structure and the electrical gap are configured to promote an omnidirectional radiation pattern.

In some examples, the radiator and the shorting arrangement are configured to extend perpendicularly from the ground plane.

In some examples, the conductive structure is configured as a capacitance hat. In some examples, the conductive structure is ring-shaped.

In some examples, the portion of the radiator is a distal end of the radiator, and wherein the conductive structure is approximately coplanar with the distal end of the radiator.

In some examples, the antenna comprises dielectric material defining the electrical gap. In some examples, the dielectric material is a substrate or is on a substrate, and wherein the conductive structure is layered on the substrate.

In some examples, the shorting arrangement comprises one or more lines. In some examples, the shorting arrangement comprises a plurality of lines approximately equispaced around a periphery of the radiator. In some examples, the shorting arrangement is configured to electrically connect the conductive structure to the ground plane.

According to an aspect of the invention there is provided a vehicle antenna apparatus comprising the ground plane and the vehicle antenna.

In some examples, the ground plane has a larger surface area than the conductive structure.

In some examples, the ground plane comprises an aperture through which the radiator electrically connects to the feed point.

In some examples, the ground plane is substantially coplanar with a proximal end of the radiator, proximal to the feed point.

In some examples, the ground plane comprises a conductive sheet configured to be secured to a vehicle body structure.

According to an aspect of the invention there is provided a vehicle comprising the vehicle antenna or the vehicle antenna apparatus.

In some examples, the radiator extends from the ground plane towards but not through a plane of a vehicle upper-body exterior panel.

In some examples, the vehicle comprises a vehicle upper-body cavity configured to receive the vehicle antenna.

According to an aspect of the invention there is provided a system comprising a plurality of vehicle antennas, in the vehicle upper-body cavity.

Within the scope of this application it is expressly intended that the various aspects, embodiments, examples and alternatives set out in the preceding paragraphs, in the claims and/or in the following description and drawings, and in particular the individual features thereof, may be taken independently or in any combination that falls within the scope of the appended claims. That is, all embodiments and/or features of any embodiment can be combined in any way and/or combination that falls within the scope of the appended claims, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;

FIG. 2 illustrates an example of a vehicle antenna apparatus;

FIGS. 3A, 3B illustrate an example of a vehicle antenna apparatus;

DETAILED DESCRIPTION

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as commercial vehicles.

Figure 4A:
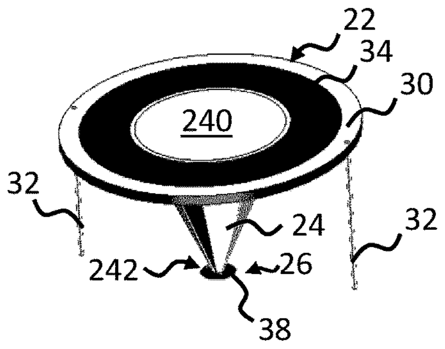
FIGS. 4A,4 B illustrate an example of a vehicle antenna apparatus and a graph of simulated S11 parameters for the vehicle antenna apparatus.

FIGS. 2, 3A, 3B and 4A illustrate an example geometry for the vehicle antenna apparatus 20. FIG. 2 is a side view. FIG. 3A is a top view. FIG. 3B is a section view. FIG. 4A is a perspective view.

In summary, the vehicle antenna apparatus 20 comprises a vehicle antenna 22 and a ground plane 26, each described below.

The ground plane 26 can either be a part of a vehicle body structure or can be an electrically conductive sheet secured to the vehicle body structure. The conductive sheet can be a metallic sheet or similar.

The vehicle antenna 22 comprises a radiator 24 extending from the ground plane 26. The radiator 24 and other structures of the vehicle antenna 22 are configured to promote an omnidirectional radiation pattern without the required height of a straight monopole. In this example, but not necessarily in all examples, the radiator 24 is an inverted cone shape (monocone) with its tip (proximal end 242) proximal to the ground plane 26 and its base 240 distal from the ground plane 26. The inverted cone radiator 24 can be an axisymmetric surface of revolution for omni-directionality. The illustrated cone is a right circular cone. The vehicle antenna 22 can be symmetric about the cone axis, having an order of rotational symmetry of at least 2.

The vehicle antenna 22 also comprises a feed point 28 configured to enable electrical connection of the radiator 24 to a feed line leading to circuitry (not shown). The feed point 28 can conductively connect to the tip 242 of the inverted cone radiator 24 as shown in FIG. 2. As shown in FIG. 4A, the ground plane 26 can comprise an aperture 38 through which the tip 242 of the inverted cone radiator 24 can electrically connect to the feed point 28 without conductively contacting the ground plane 26. The tip 242 of the cone can be approximately coplanar with the ground plane 26.

Further, the vehicle antenna 22 comprises a shorted electrically conductive structure 30 above the ground plane 26 and arranged around a distal portion 240 of the radiator 24, the distal portion 240 referring to a part of the radiator 24 that is distal from the ground plane 26 and the feed point 28.

In the illustrated examples, but not necessarily in all examples, the conductive structure 30 is an annular ring (disk) shape, surrounding the distal portion 240 of the inverted cone radiator 24. Further, the distal portion 240 refers to the base (distal end, widest point) of the inverted cone radiator 24. In the illustrations, the conductive structure 30 is coplanar with and surrounds the base 240 of the inverted cone radiator 24, having a greater inner diameter than the outer diameter of the base 240. The inner circumference of the conductive structure 30 is approximately equidistant from the outer circumference of the base 240 of the inverted cone radiator 24.

In some examples, both the inner and outer circumferences of the conductive structure 30 are circular or near-circular, as well as the base 240 of the inverted cone radiator 24 being circular. This promotes an omnidirectional radiation pattern.

The conductive structure 30 does not make conductive contact with the radiator 24. Instead, an electrical gap 34 is provided between an inner diameter of the conductive structure 30 and an outer diameter of the distal portion 240 of the radiator 24. The electrical gap 34 is visible in FIGS. 3A, 3B and 4A. The electrical gap 34 prevents conductive coupling between the conductive structure 30 and the radiator 24 but small enough to enable a capacitive coupling between the conductive structure 30 and the radiator 24. The conductive structure 30 can therefore be regarded as a capacitance hat (also referred to as a top hat). The electrical gap 34 can be an air gap or can comprise insulating (dielectric) material. The gap 34 can have approximately constant radial thickness. The radial thickness of the gap 34 refers to the average difference between the inner radius of the conductive structure 30 and the outer radius of the base 240 of the inverted cone radiator 24.

The conductive structure 30 does not directly contact the ground plane 26 and is instead supported at an elevated position above the ground plane 26, towards the base 240 of the inverted cone radiator 24. The conductive structure 30 is shorted by a shorting arrangement 32 configured to electrically connect the conductive structure 30 to ground, such as to the ground plane 26. The shorting arrangement 32 can be soldered to the ground plane 26 and to the conductive structure 30, for example. The shorting arrangement 32 can comprise an electrical line such as a wire, a rod or a plate. In the examples, a discrete shorting arrangement 32 (e.g. line) is used as opposed to a continuous surround. If the shorting arrangement 32 is stiff and rigid, it can also act as a structural prop/column supporting the weight of the conductive structure 30.

In order to avoid asymmetry, a plurality of approximately equispaced discrete lines 32 are shown. In the illustrations, the shorting arrangement 32 comprises a pair of lines 32 angularly separated from each other by 180 degrees around the cone axis of the inverted cone radiator 24. Three lines 32 could be equispaced at 120 degrees. Four lines 32 could be equispaced at 90 degrees. More lines 32 could be provided. Each of the lines 32 creates an electrically conductive connection between the conductive structure 30 and the ground.

The capacitive coupling between the radiator 24 and the shorted conductive structure 30 provides a technical effect that the operable frequency is lowered without having to enlarge the inverted cone radiator 24 and/or enlarge the ground plane 26. This enables the vehicle antenna 22 to be small and packaged in a hidden manner, such as between a headliner and a roof panel. A small ground plane 26 means that a set of vehicle antennas can be packaged close to each other for MIMO, with minimal mutual coupling.

In an example, a small vehicle antenna 22 refers to dimensions of the following order of magnitude:

Height H less than 10 cm; and

Outer diameter Dt of the conductive structure 30 less than 15 cm; and

Ground plane length D less than 50 cm although D could be larger in other examples.

The minimum achievable values of H, Dt and D depend on the minimum frequency in which the vehicle antenna 22 is configured to efficiently resonate. In examples of the present disclosure, efficiency between at least 700 MHz and 5 GHz is desired, wherein for H>2 cm, Dt is about 1.5× to 2.5× of H, and a minimum tested value of D is 10 cm. However, these values could be traded against each other and against dimensions other than H, Dt and D. Matching circuitry can also be used to compensate for geometric trade-offs and to fine-tune performance.

Regarding other dimensions, the diameter dc of the base 240 of the inverted cone radiator 24 can be a value between approximately one quarter and three quarters of the value of Dt.

As shown in FIG. 3A, the radial thickness g of the electrical gap 34 can be the same or greater than the radial thickness of the conductive structure 30. The radial thickness g can have a constant or average value between approximately Dt/16 and Dt/3. The selected radial thickness g can depend on the selection of the dielectric properties of the electrical gap 34. For example, an air gap has a different dielectric constant than a ring of dielectric material.

FIG. 3B illustrates how the electrical gap 34 can be provided by dielectric material 340. FIG. 3B is a cross-section A-A through the conductive structure 30, the electrical gap 34 and the radiator 24. A ring (disk) of electrically conductive material (e.g. copper or aluminium) can be layered onto a substrate 36, forming the conductive structure 30. A ring (disk) of dielectric material 340 such as FR4 (glass-reinforced epoxy laminate) can be layered onto the substrate 36, forming the electrical gap 34. Alternatively, no dielectric material is layered on the substrate 36, and the substrate 36 itself can provide the electrical gap 34. The arrangement can be manufactured as a printed circuit board, for example, wherein the electrical gap 34 may be etched out during manufacture, exposing the substrate 36. The printed circuit board could be configured to contact and support the base 240 of the inverted cone radiator 24. The substrate 36 in FIG. 3B can enable a structural support, such as a rigid version of the shorting arrangement 32, to support the combined conductive structure 30, dielectric material 340 and even the inverted cone radiator 24. The inverted cone radiator 24 can be hollow and may have no surface at its base 240.

Regarding orientation and alignment, the cone axis of the inverted cone radiator 24 can be approximately perpendicular to the ground plane 26, for omnidirectional performance. The conductive structure 30 can be approximately perpendicular to the cone axis of the inverted cone radiator 24 and therefore can be parallel to the ground plane 26. The shorting arrangement 32 can extend approximately perpendicularly to the ground plane 26.

Regarding areas, the ground plane 26 can have a larger surface area than a surface area of the conductive structure 30, for example more than double or more than ten times the area. In FIG. 3A the ground plane 26 has a much larger area than the conductive structure 30.

Figure 4B:
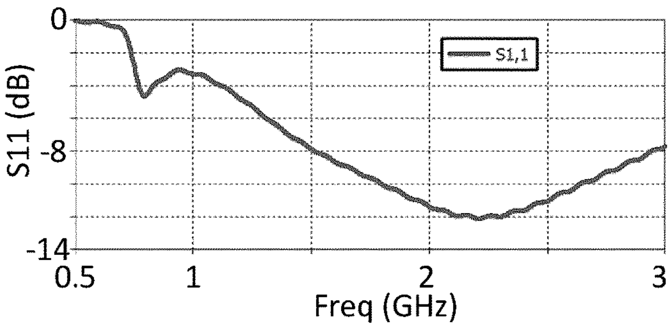

FIG. 4B illustrates S11 parameters for a simulated vehicle antenna apparatus 20 as shown in FIG. 4A, with H=2.7 cm, Dt=6 cm, g=1 cm, dc=3.2 cm, and a circular ground plane 26 of diameter D=0.2 m. This simulation characterises the vehicle antenna apparatus 20 only and a vehicle is not modelled. The results of the simulation were confirmed by an experiment with a prototype of copper conductive material and FR4 as the dielectric material 340 for the electrical gap 34.

For the prototype at these particular dimensions, the simulation has shown good impedance matching S11=−10 dB from 1.8 GHz to 2.6 GHz. For sub-1 GHz frequency range, −3 dB matching has been achieved from 750 MHz to 960 MHz. The weak impedance matching at sub-1 GHz frequency bands can be improved by increasing the ground plane 26 size D in FIG. 2 or antenna height H or outer diameter Dt of the conductive structure 30. Small increase of size D, H or Dt can also tune the antenna to cover lower frequency bands to 600 MHz. Otherwise matching circuitry can be used to improve impedance matching.

The radiated efficiency was: −0.37 dB at 0.8 GHz; −0.01 dB at 0.96 GHz; −0.03 dB at 1.8 GHz; and −0.04 dB at 2.69 GHz. The total radiated efficiency was: −2.22 dB at 0.8 GHz; −2.6 dB at 0.96 GHz; −0.49 dB at 1.8 GHz; and −0.52 dB at 2.69 GHz. The realised gain was: −0.18 dBi at 0.8 GHz; −1.23 dBi at 0.96 GHz; 3.62 dBi at 1.8 GHz; and 4.32 dBi at 2.69 GHz.

The radiation efficiency is better than 90% across the entire cellular frequency bands. Total efficiency is better than 55% at sub-1 GHz band due to weaker matching performance. Overall realised gain for standalone antenna is good. It has the potential to be improved providing a larger ground plane can be installed when implementing on the vehicle.

The above results show that the vehicle antenna apparatus 20 is capable of cellular communication (0.7-3 GHz) and potentially even higher frequencies: later results show effectiveness at 5 GHz. Enlargement or matching circuitry can improve frequencies below 0.7 GHz.

A variant having H=3.6 cm and dc=4 cm was tested which revealed further improvements at sub-1 GHz frequencies.

An operational frequency band (operational bandwidth) is a frequency range over which an antenna can efficiently operate. An operational frequency band may be defined as where the reflection coefficient S11 of an antenna is less than an operational threshold T such as, for example, −6 dB and where a radiated efficiency is greater than an operational threshold such as for example −1.5 dB (70%) in an efficiency plot. Radiation efficiency is the ratio of the power delivered to the radiation resistance of the antenna (Rrad) to the total power delivered to the antenna: er=(Rrad)/(RL+Rrad), where RL=loss resistance (which covers dissipative losses in the antenna itself). It should be understood that "radiation efficiency" does not include power lost due to poor VSWR (mismatch losses in the matching network which is not part of the antenna as such, but an additional circuit). The "total radiation efficiency" comprises the "radiation efficiency" and power lost due to poor VSWR [in dB]. The efficiency operational threshold could alternatively be expressed in relation to "total radiation efficiency" rather than "radiation efficiency". The threshold for total radiation efficiency can also be −3 dB (50%).

Figure 5A:
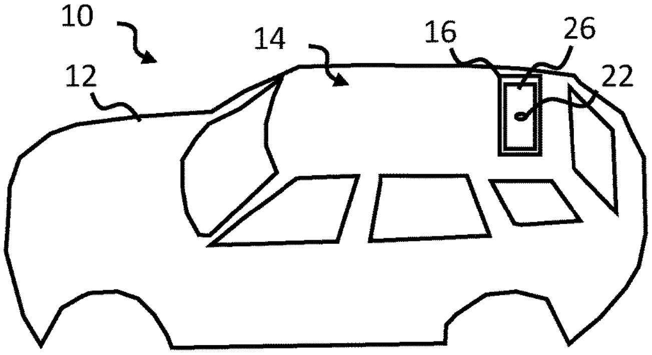
FIGS. 5A-5D illustrate an example of a vehicle antenna apparatus in a vehicle, and performance metrics for the vehicle antenna apparatus in the vehicle.

FIGS. 5A-5D illustrate the results of simulations for the vehicle antenna apparatus 20 with the above dimensions of FIG. 4A, in a vehicle 10 as shown in FIG. 5A. FIG. 5A illustrates a vehicle body structure 12 such as a body in white, and the vehicle antenna apparatus 20 at a roof 14 or similar high point on the vehicle body structure 12.

The vehicle antenna apparatus 20 can be received within a vehicle upper-body cavity 16 of the vehicle body structure 12, such as a roof cavity. The roof cavity 16 is a gap in the metal roof 14 to prevent radio frequency blocking. The gap could be covered by a glazing panel (e.g. sunroof/panoramic window) or a plastic overstructure (not shown) or any other appropriate material that does not block radio frequencies. In the illustration, but not necessarily all examples, the upper-body cavity 16 is to an aft of the vehicle 10.

In this example, the ground plane 26 is a conductive sheet secured to the vehicle body structure 12. The illustrated ground plane 26 is rectangular and has a longest dimension selected from the range 10 cm-50 cm. The ground plane 26 could have another shape. The ground plane 26 can be hidden above a headliner, not visible from the interior. The vehicle antenna 22 can be located on and above the ground plane 26. The small height of the vehicle antenna 22 enables the vehicle antenna apparatus 20 to be provided between the headliner and the top of the roof 14, above the level of roof pillars, without the need for a substantial roof bulge. The glazing panel or overstructure may be approximately coplanar with the surrounding metal body structure 12, to provide an aesthetically and aerodynamically clean surface. If there is a bulge, it could be kept to below 20 mm.

The orientation of the vehicle antenna apparatus 20 can be such that the vehicle antenna apparatus 20 is vertically polarized for maximum radiation parallel to the ground.

Figure 5C:
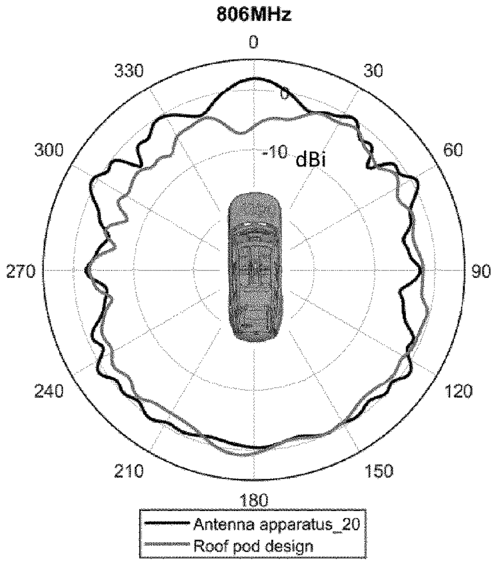
Figure 5B:
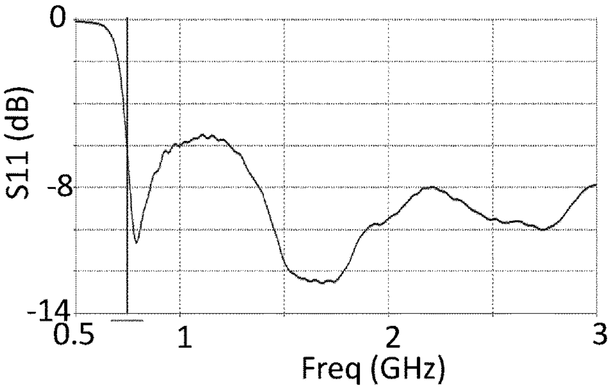

FIG. 5B illustrates S11 parameters for the arrangement of FIG. 5A. The results show that −6 dB impedance matching has been achieved from 740 MHz to 3 GHz.

Figure 5D:
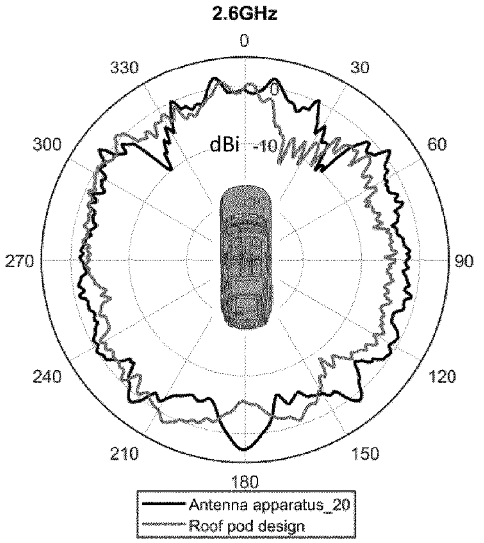

FIG. 5C illustrates radiation performance at 3 degrees of elevation, at 806 MHz. The performance of a conformal folded monopole antenna (roof pod design) and an example of vehicle antenna apparatus 20 are shown for comparative purposes. FIG. 5D differs from FIG. 5C in that the frequency is 2.6 GHz. As shown in these results, the vehicle antenna apparatus 20 can achieve similar performance to the best performing roof pod antennas.

It would be appreciated that the vehicle antenna apparatus 20 does not have to be positioned at the location shown in FIG. 5A. Other locations are possible, such as within the interior of the vehicle 10 (parcel shelf) or on another part of the vehicle body structure 12. At lower positions on the vehicle 10, more vehicle antennas 22 may be needed for full 360 degree coverage.

Further investigations revealed that if the radiator 24 protrudes above the roofline/roof level, for example by 10-20 mm, omnidirectionality is improved further due to reduced radio blocking by roof pillars. However, a bulge/roof pod may be needed.

Further investigations revealed that a plurality of vehicle antennas 22 can be provided close together with acceptable mutual coupling. For example, they can be placed within the same vehicle upper-body cavity 16. This enables a more diverse MIMO capability when the vehicle antennas 22 are controlled as a system in combination.

Figure 6A:
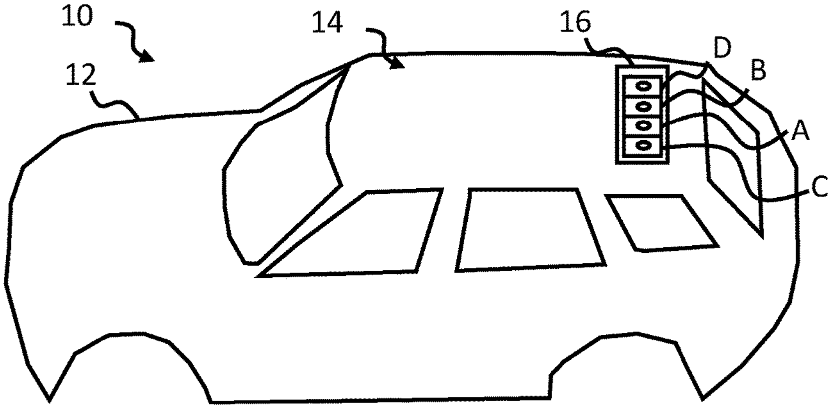
FIGS. 6A-6E illustrate an example of a plurality of vehicle antenna apparatus in a vehicle, and performance metrics of the plurality of vehicle antenna apparatus in the vehicle.

In FIGS. 6A-6E, simulation results are shown for four vehicle antennas located within the same vehicle upper-body cavity 16, not protruding above the roofline. In FIG. 6A, the vehicle antennas are labelled A, B, C, D (3-2-4-1 order in the row), each vehicle antenna A-D being an antenna 22 as described earlier. The vehicle antennas A-D are arranged in a single row extending from a left side to a right side of the vehicle 10. Alternatively, a single column is provided or a combination of rows and columns is provided.

The vehicle antennas A-D can either connect to individual ground planes (ground plane 26 as described earlier) or can share a single ground plane. In FIG. 6A, the vehicle antennas A-D connect to their own individual ground planes. The ground planes can have a width having a value selected from 10 cm to 30 cm, in the width dimension of the vehicle 10. The illustrated ground planes are 20 cm×20 cm square sheets and are approximately coplanar with each other.

A gap between neighbouring ground planes 26 can be provided, to reduce mutual coupling. The gap size can be a value from the range approximately 0.5 cm to approximately 30 cm, for example. In FIG. 6A, substantially no gap is provided, so the centre-to-centre distance between neighbouring vehicle antennas is approximately the same as the width of the ground plane 26 (e.g., 20 cm).

A minimum edge gap between a ground plane edge to a nearest edge of the upper-body cavity 16 can be a value of greater than 1 cm, with higher values generally being better. In the arrangement of FIG. 6A, the edge gap between element C/D to the shorter edge of the cavity is 16 cm.

Figure 6B:
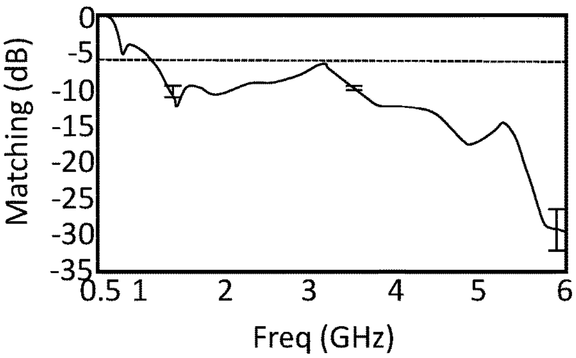

FIG. 6B is a graph illustrating the average matching (dB) on the y-axis, against frequency (GHz) in the x-axis. Bars represent the range between the four measurements. The bars show that all four vehicle antennas A-D have similar matching to each other.

For cellular communication, matching of −6 dB or lower matching would be acceptable. A horizontal dashed line is drawn at −6 dB. Any band below −10 dB matching would be good. FIG. 6B shows that all frequencies above 1 GHz provide acceptable to good matching.

Mutual coupling for every pairing of the vehicle antennas A-D was also calculated. The average mutual coupling fell steadily from about −25 dB at 0.5-1.5 GHz, to about −40 dB at 5-6 GHz.

Figure 6C:
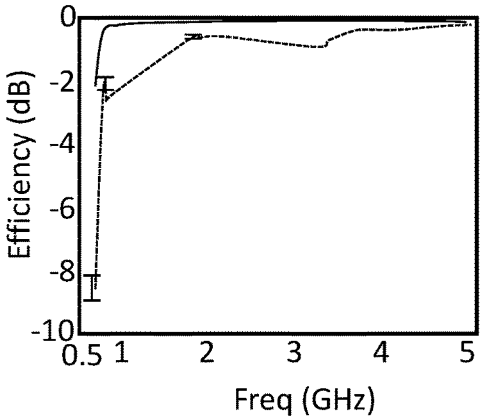

FIG. 6C shows the average efficiency (dB) on the y-axis, against the same frequency x-axis. The average radiated efficiency is a solid line and the range between measurements of the individual vehicle antennas is negligible. The average total efficiency is a dashed line and the range is shown by bars. The bars show that all four vehicle antennas A-D have similar total efficiency.

The total efficiency is high (better than −3 dB) at frequencies greater than approximately 700 MHz, and low below 700 MHz. However, the high radiated efficiency means that the efficiency can be improved by using matching circuitry.

Figure 6D:
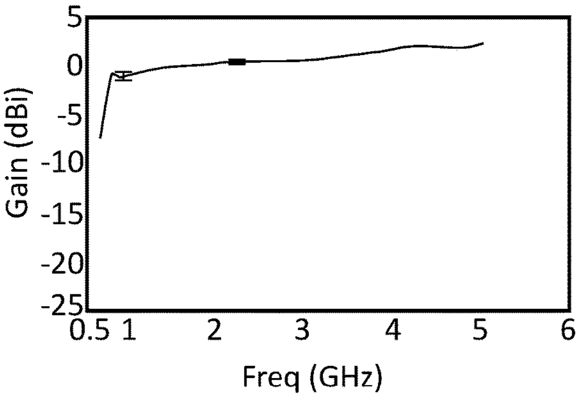

FIG. 6D shows the average realised gain (dBi) on the y-axis, against the same frequency x-axis. Variation between the vehicle antennas A-D is negligible as shown by the bars. The gain is better than −3 dB above 700 MHz. The low gain level below 700 MHz can be improved using matching circuitry.

Further investigations revealed that a larger ground plane can also improve antenna gain at the lower frequencies, without necessarily having to increase the height H.

Figure 6E:
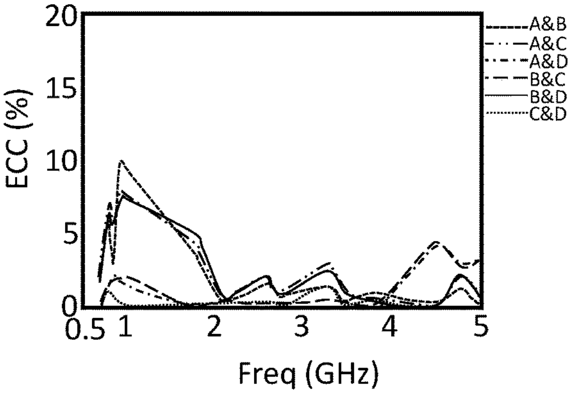

FIG. 6E shows the individual envelope correlation coefficients (ECC) for every antenna pairing, against the same frequency x-axis. An ECC of 30% or below is good for MIMO applications (e.g., 2×2 MIMO). The results show that all ECCs are below 10%.

Further investigation was performed in which the number of vehicle antennas within the vehicle upper-body cavity 16 was halved to two vehicle antennas. As a single row (across vehicle width), the ground planes were 20 cm×20 cm with 5 cm gaps therebetween. It was found that the radiation pattern was similar to that of a single element (FIGS. 5A-5D). The mutual coupling was better than −20 dB.

As a single column (along vehicle length), the ground plane length along the length dimension of the vehicle 10 was shortened to 15 cm and the gap was deleted, due to the limited space. Of course, some vehicles could have longer cavities to better accommodate a column of vehicle antennas 22. The results showed slightly higher mutual coupling than the single row, but broadly similar radiation patterns.

It will be appreciated that various changes and modifications can be made to the present invention without departing from the scope of the present application.

Although embodiments of the present invention have been described in the preceding paragraphs with reference to various examples, it should be appreciated that modifications to the examples given can be made without departing from the scope of the invention as claimed. For example, the radiator 24 could be a different surface of revolution than a cone, such as a cylinder, at the expense of lower bandwidth. As another alternative to a symmetrical cone, a pyramid-shaped radiator could work but not as well as a cone. As a further alternative, the illustrations show the inverted cone radiator having a solid surface: this could potentially be replaced with a multiwire or cage structure.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A vehicle antenna comprising:

a plurality of radiators;

each radiator configured to extend from a respective ground plane;

each radiator comprising:

a feed point;

a conductive structure having a first radial thickness and being around a portion of the radiator, the portion being distal from the respective ground plane;

an electrical gap between the conductive structure and the portion of the radiator, the electrical gap having a second radial thickness being the same or greater than the first radial thickness; and a shorting arrangement configured to electrically connect the conductive structure to the respective ground plane, wherein the radiator is an inverted cone radiator comprising a hollow conical shape having a surface of revolution and being open at a base of the inverted cone radiator.

2. The vehicle antenna of claim 1, wherein the ground planes are a part of a vehicle body structure.

3. The vehicle antenna of claim 2, wherein the vehicle antenna is configured to be received at a roof cavity of the vehicle body structure.

4. The vehicle antenna of claim 1, wherein the radiator, the conductive structure and the electrical gap are configured to promote an omnidirectional radiation pattern.

5. The vehicle antenna of claim 1, wherein the radiator and the shorting arrangement are configured to extend perpendicularly from the respective ground planes.

6. The vehicle antenna of claim 1, wherein the conductive structure is configured as a capacitance hat.

7. The vehicle antenna of claim 1, wherein the conductive structure is ring-shaped.

8. The vehicle antenna of claim 1, wherein the portion of the radiator is a distal end of the radiator, and wherein the conductive structure is approximately coplanar with the distal end of the radiator.

9. The vehicle antenna of claim 1, comprising dielectric material defining the electrical gap.

10. The vehicle antenna of claim 1, wherein the shorting arrangement comprises one or more lines.

11. The vehicle antenna of claim 1, wherein the shorting arrangement is configured to electrically connect the conductive structure to the respective ground planes.

12. A vehicle antenna apparatus comprising the vehicle antenna of claim 1.

13. The vehicle antenna apparatus of claim 12, wherein the ground planes comprises an aperture through which the radiator electrically connects to the feed point.

14. The vehicle antenna apparatus of claim 12, wherein the ground planes are substantially coplanar with a proximal end of the radiator, proximal to the feed point.

15. The vehicle antenna apparatus of claim 12, wherein the ground planes comprises a conductive sheet configured to be secured to a vehicle body structure.

16. A vehicle comprising the vehicle antenna of claim 1.

17. A vehicle comprising the vehicle antenna apparatus of claim 12.

18. The vehicle antenna of claim 9, wherein the dielectric material is a substrate or is on a substrate, and wherein the conductive structure is layered on the substrate.

19. The vehicle antenna of claim 10, wherein the shorting arrangement comprises a plurality of lines approximately equispaced around a periphery of the radiator.

20. The vehicle antenna apparatus of claim 12, wherein the ground planes have a larger surface area than the conductive structure.

* * * * *